June 10, 1947.  F. DANIELS ET AL  2,421,744
GAS REACTION FURNACE
Filed Aug. 16, 1943  2 Sheets-Sheet 2

Inventors:
Farrington Daniels,
William F. Hendricks
Frank M. Wolf.
By Pierce & Scheffler, their Attorneys.

Patented June 10, 1947

2,421,744

UNITED STATES PATENT OFFICE 2,421,744

GAS REACTION FURNACE

Farrington Daniels, William G. Hendrickson, and Frank M. Wolf, Madison, Wis., assignors to Wisconsin Alumni Research Foundation, Madison, Wis., a corporation of Wisconsin Application August 16, 1943, Serial No. 498,896

8 Claims. (Cl. 23—277)

This invention relates to the provision of an improved furnace adapted for use in the high-temperature treatment of gases. The invention is concerned more particularly with an improved furnace, of the "pebble-bed" type, peculiarly adapted for use in the thermal fixation of atmospheric nitrogen as nitric oxide, but is, of course, not restricted to this particular use of the furnace, the latter having utility also in other high temperature oxidation processes and the like.

The temperature attainable by burning fuel gases with atmospheric air are ordinarily limited to about 1700° C. as a maximum on account of the large heat capacity of the air. Higher temperatures, e. g., temperatures as high as or higher than 2000° C., which are desirable in the fixation of atmospheric nitrogen as nitric oxide, can be obtained by pre-heating the air prior to the combustion (or by enriching the air with oxygen, or by a combination of these expedients).

For carrying out the thermal fixation of atmospheric nitrogen as nitric oxide it has been proposed to make use of an apparatus comprising a pair of Royster pebble-bed stoves positioned side by side and joined at their upper ends by a thermally insulated conduit (or, "cross-over") communicating between the spaces at the tops of the stoves above the pebble beds and providing with said spaces a suitable space for the combustion of a fluid fuel, introduced into the apparatus at such conduit, in air which has been pre-heated by its upward passage through whichever one of the pair of pebble bed stoves was in a heated state at the outset of the process step, the resulting gaseous reaction mixture being cooled by heat-exchange with the relatively "cold" pebble bed of the other stove during downward passage of the gaseous mixture through the latter. By suitable reversals in the direction of flow of the air through the apparatus the heat developed within the latter largely is conserved therewithin. The pebble beds provide an effective means for pre-heating the incoming air and reaching high temperatures, and also provide an effective means for realizing the quick chilling of the gaseous reaction mixture.

It is an object of the present invention to provide an improved furnace for the high temperature treatment of gases, particularly for carrying out the above referred to process for the thermal fixation of atmospheric nitrogen as nitric oxide, so constructed as to be operable for carrying out such process without highly heating either the roof or the floor of the apparatus and to have no connecting conduit extending from a highly heated wall of the furnace.

A further object of the invention is to provide a thermal reaction furnace having no rigid intermeshing parts, or parts extending along different axes, in those portions of the furnace wherein the highest temperatures are developed.

Another inventive object is the provision of a furnace, of the general type previously described, so constructed that gaseous fuel can be led to the combustion space intermediate the pebble beds without the use of pipes, or other conductors, attached to a highly heated wall of the furnace. A further inventive object is the provision of a furnace design which is susceptible of being embodied in large as well as small structures.

Other modifications of a "pebble bed" furnace and operation thereof in the thermal fixation of atmospheric nitrogen as nitric oxide are described in the copending application of Farrington Daniels, Serial No. 538,898, filed June 6, 1944, and the copending application of Farrington Daniels and Wm. G. Hendrickson, Serial No. 549,705, filed August 16, 1944.

It has been found that the above difficulties may be avoided, and that the above, and other, inventive objects may be realized, by recourse to the novel furnace structure of the present invention. According thereto, the two pebble beds (for pre-heating the air, and for chilling the gaseous products and conserving the heat so abstracted) are positioned one above the other in a tubular, e. g., generally cylindrical, thermally insulated vessel, the two pebble beds being separated by an intermediate gas-mixing and combustion space provided by the interstices in a relatively thick bed of macadamized pieces of refractory material including refractory pieces equivalent in mass to spheres 2 or more inches in diameter, i. e., of a size too large to function acceptably as quick-chilling means and sufficiently large to provide continuous surfaces for spreading the fuel gas and for mixing it with air. By "macadamization" is meant the layering of progressively increasing (or decreasing) sizes of the refractory pieces, the sizes employed for the successive layers being so chosen that there is no opportunity for substantial intermingling of finer and coarser pieces. All of the pebbles or refractory pieces composing said relatively thick bed have sizes larger than that (or those) of the particles composing said pebble beds. The term "tubular" is used in this disclosure as having the meaning and scope defined in Webster's New International Dictionary, second edition.

The aforesaid centrally disposed bed between the two pebble beds may consist of a relatively thick layer of large chunks of refractory material supported upon the top of the lower pebble bed, with a macadam thereon of smaller and smaller pebbles up to the upper pebble bed per se. In this form of structure, the macadam above the combustion space providing largest sized chunks (i. e., pieces equivalent in mass to spheres 2 or more inches in diameter) serves to prevent any substantial sifting down of the relatively small pebbles constituting the upper pebble bed.

In lieu of the above form, the aforesaid centrally disposed bed may be and preferably is composed of doubly macadamized refractory pieces. By the expression "doubly macadamized" is here meant that arrangement of the elements composing said centrally disposed bed according to which the largest refractory pieces are in a median layer, or in median layers, of said centrally disposed bed with progressively decreasing sizes of pieces of refractory material in successive layers upwardly and downwardly therefrom toward the pebble beds per se. The double macadamizing serves to insure the intimate mixing of fuel gas and air prior to their passage into the interstices of the largest sized refractory chunks: also, the lower macadamization serves to maintain a relatively even contour on the surface of the lower pebble bed, and to prevent commingling of pebbles from the pebble bed with the larger pieces of the aforesaid central bed in operations involving a combination of very small particles in the pebble beds and relatively high air velocities. The fuel gas is brought into the furnace (in a manner hereinafter more particularly described) through whichever one of the pair of pebble beds is, at that time, functioning as the "preheating" bed, and in the same direction as, and substantially parallel to, the stream of air being preheated therein. It is an important feature of the invention that tubes or other rigid conductors for introducing fuel gas into the combustion space do not need to be attached to, or to pass through, a highly heated wall of the furnace structure. It has been found that if a narrow diametered stream of fuel gas be injected into a bed of small pebbles or similar particles so that the two waves (that is, of the fuel gas stream and of the air stream) travel in the same direction, there will be no substantial spreading of the fuel gas wave in the bed, and that any substantial mixing of the fuel gas with the air during their simultaneous passage through the preheating bed may be avoided by proper selection of size of the particles constituting said bed (viz., by forming the bed of relatively small particles, as later explained).

It has been found, further, that when the fuel gas stream has passed through the preheating bed of relatively small pebbles and enters the aforesaid centrally disposed bed of larger refractory objects or bodies it (the stream) will spread to wider and wider dimensions, and mix with the surrounding air stream, in a manner which depends upon the size of the bodies in each layer of the macadam and upon the depth of each layer and upon the extent of macadamization. The spreading of the fuel gas stream, in such passage through the centrally disposed bed, involves progressive mixing between the fuel gas and the surrounding air, to the end that by the time the two streams reach the zone of the largest refractory chunks they are intimately admixed and complete combustion can be realized, in the relatively large interstices which characterize this zone, during an interval determined by the depth and particle size of the macadamized layers and the ratio of fuel gas to air, their relative pressures and their rates of flow. Use of standard type ceramic mixing plates imbedded at appropriate locations in the mass of refractory bodies of said centrally disposed bed might be helpful in bringing about complete mixing of the gases.

We have determined, by the carrying out of numerous experiments, (a) what sizes of pebbles (for the pebble bed) are necessary in order to prevent material mixing of air and fuel gas during their simultaneous passage through the preheating pebble bed (where, of course, such mixing must be avoided as much as possible while the air is being preheated in order to postpone combustion until the air has been preheated whereby to obtain the optimum combustion temperature), and (b) what sizes of bodies and what depths of layers (for the aforesaid centrally disposed bed) are necessary in order to bring about complete mixing of air and fuel gas in the aforesaid mixing and combustion space, when the air has been preheated and combustion is desired. Thus, we have found that the diameter of the fuel gas stream at entrance—say, a ¾ inch diameter stream—is not appreciably increased in passage of the stream through a one-foot bed of pebbles of a size not to exceed 3 mesh (Tyler screen), e. g., of 6–10 mesh size, through which bed air simultaneously is being passed, in the same direction, at the approximate rate of 40 cu. ft. or more per minute per square foot of bed area, this finding being evidenced by the fact that the fuel gas stream emanating from the bed burns in a ring not materially larger in diameter than the size of the pipe by which said stream is projected into said bed from the opposite end of the latter. And, we have found that when these substantially unmixed streams of fuel gas and air (the fuel gas stream being within the larger stream of air) thereafter are passed through a series of layers of larger refractory bodies of graduated sizes to and including a layer, about 1 foot or more in depth, of chunks of refractory material several inches (say, 5 or 6 inches or more) in diameter, the fuel gas and air progressively become more and more thoroughly mixed so that they burn completely in the interstices between the largest sized refractory chunks, the resulting flame having a spread of over 1.5 square feet in said layer.

This phenomenon finds particular application in cases where the fuel gas employed is thermally stable or substantially so. Thus, in the case of a fuel gas which consists predominately of $CO$ or $H_2$ or a mixture of $CO$ and $H_2$, e. g., producer gas, we can and prefer to limit the extent of projection of the fuel gas inlet into the filling to the outer ("cold") edge of the preheating bed, for the obvious reason of minimizing cooling of the adjacent particles of the bed. If, however, a fuel gas relatively rich in thermally unstable components (e. g., benzene, ethylene, propane and similar hydrocarbons) is used in the process, we prefer to extend the water-cooled inlet for the fuel gas further into the preheating bed (e. g., for, say, one-third or one-half of the depth of the preheating bed) or through the same and to or into the aforesaid mixing and combustion zone. Such a measure minimizes cracking of components of the fuel gas in the pre-heating bed with its consequent deposition of solid carbon therein, with only a small loss of heat from the pre-heating bed (in one experiment, only about 200 B. t. u. per minute of heat were removed by the water-cooled inlet while 7000 B. t. u. per minute were being produced by combustion of fuel gas). The optimum extent of penetration of fuel gas inlet depends, therefore, in part upon the choice of fuel gas. Regardless of the fuel used, another advantage of extending the fuel inlets through the preheating bed is to avoid any combustion prior to complete preheating of the air. These fuel gas inlets are uniformly arranged with respect to the cross-sectional area of the pebble bed, and may be, and preferably are, in the form of water-jacketed pipes. The inner ends of these inlets may be in the form of ceramic tubes, so as to extend the inlets while reducing as much as possible the cooling of the pre-heating pebble bed. We can add steam to the fuel gas for scavenging any carbon fortuitously deposited in the ceramic tubes. The air stream is led into the furnace according to standard practice.

As will be appreciated, the number of fuel gas inlets to be employed is determined by the chosen cross-sectional dimension of the pebble beds and aforesaid centrally disposed bed; while the number should be kept to a minimum, in order to minimize cooling in the preheating zone, it should be sufficiently large to spread the fuel gas-air mixture over a maximum possible part of the combustion zone, as described above.

The depth of the combustion zone (in the aforesaid centrally disposed bed) likewise is a matter of importance. This zone, which is provided by the largest sizes of refractory chunks, must be deep enough to insure complete mixing and complete combustion, and also to insure an adequate interval for fixation of nitrogen in the gas mixture. Since the function of the functionally second pebble bed (that is the pebble bed on the "far," or exit, end of the aforesaid vertically central zone of the shaft filling) is to effect quick chilling of the highly heated gaseous reaction mixture, it is desirable that combustion be completed before the gases enter said second pebble bed.

As will be understood, the furnace is equipped with the necessary conduits, valves and other equipment for (1) leading the air and the fuel gas at successive intervals to and into the preheating pebble bed and (2) for leading the cooled gaseous reaction mixture from the cooling pebble bed to appropriate apparatus (forming no part of the present invention) for recovering and working up the wanted components of said mixture. This necessary equipment includes one or more pumps or blowers, reversing valves, and other standard mechanisms. It will be understood, also, that since both of the pebble beds function, successively, as the preheating bed, each of them may be appropriately equipped with a set of the fuel gas inlets.

From the standpoint of operation, or process, it will be seen that a current of air is forced, at a controlled rate of flow, into and through the preheating bed of relatively small pebbles, through the adjacent doubly macadamized assemblage of larger refractory bodies, and through the adjacent cooling bed of relatively small pebbles; that simultaneously a relatively small stream of fuel gas is, or a number of spaced, relatively small streams of fuel gas are, forced into or through the preheating bed, by means of the gas inlet or set of gas inlets, in the same direction as that of the air; that the fuel gas stream or streams injected by said inlet or inlets, when discharged short of the macadam, pass through the remaining part of the preheating bed without materially mixing with the surrounding stream of air; that the fuel gas and air streams are completely mixed as they conjointly pass through the "near" half of the doubly macadamized assemblage of larger refractory bodies and are completely burned in the combustion zone provided by the relatively thick layer of large refractory chunks in the central part of the assemblage; and that the heat of the resulting gas mixture is transferred to the relatively small pebbles of functionally second or the cooling bed as said gas mixture passes through the latter.

The character of the "pebbles" or "refractory bodies" constituting the beds used for preheating and for cooling will now be described with greater particularity. In form, size and configuration the same may be, and preferably are, true pebbles in the Century Dictionary use of that term. Thus, they may vary in size from that of a coarse sand, e. g., through 14 and on 18 mesh Tyler screen, through the sizes of smaller and larger gravels up to those of generally rounded small rocks equivalent in mass to spheres of 2" diameter. The selection of size of particle is determined by the desired quenching rate and by the amount of back pressure permissible.

From the standpoint of composition, such "pebbles" or "refractory bodies" may consist wholly or mostly of one or more refractory oxides, including (but not limited to) $Al_2O_3$, $Cr_2O_3$, $ZrO_2$, $ZrO_2 \cdot SiO_2$ (zircon), $CaO$, $MgO$, $MgO \cdot Al_2O_3$ (spinel) and similar compositions. One such pebble product is naturally occurring periclase; another is dead burned magnesite in particle form; a third is dead burned lime in particle form.

In lieu of naturally occurring pebbles per se there may be used—where the temperatures to be encountered do not rule them out because of too low fusing temperatures or temperature ranges—"brickbats" (broken pieces) of refractory brick and similar manufactured refractory masses, selected as to size to fall within the above recited limits. It will of course be apparent that the temperature to be encountered is a major factor in determining the "pebbles" composition appropriate for any particular application. Thus, for example, in constructing pebble beds for a furnace in which to carry out the thermal fixation of atmospheric nitrogen as nitric oxide, the temperatures there employed (to wit, from about 2000° C. as a minimum up to 2400° C. or higher as a practical maximum) rule out of consideration quartz and other oxides or oxide compositions having fusing temperatures or fusing temperature ranges below say 2400° C., because obviously the filling ought not to become molten in use, and restrict the selection to bodies of pronounced refractoriness, e. g., to periclase or dead burned magnesite or dead burned lime or zirconia and similarly high-fusing oxides.

The shape of the "pebble" constituting the unit of the pebble bed is not per se critical. It may be spherical or spheroidal or have the configuration of an elongated or irregular accretion of nodules (e. g., have a peanut-like shape), all of which forms are encountered in naturally occurring refractory pebbles. All such pebbles, whether or not truly spherical in form, are characterized by having generally rounded surfaces and by the fact that by an ordinary mode of assembling them into a bed there exists a substantial amount of voids or interstices providing a multitude of fluid channels, of small mean hydraulic radius, through the bed. The amount of voids varies somewhat, depending upon the particular type of pebble material employed, but generally lies between about 35% and 40% of the over-all volume of the bed.

Now, as substitutes for pebbles themselves we may employ manufactured "shapes" (blocks, discs, rings, rods and the like) provided (1) the same are small, i. e., provided their masses are no greater, and preferably much less, than that of a 2" sphere, and present a correspondingly large surface area per cubic foot of volume of the assemblage, and (2) their assemblage in the bed is such as to provide the above mentioned substantial amounts of voids. Thus, for example, the "pebble bed" may wholly or partly be an assemblage of tiny "Raschig rings" formed from refractory material in known manner; or, it may wholly or partly be an assemblage of tiny rods or cylinders of refractory material, the cylinders having, for instance, an average long axis dimension of about 1 inch and an average diameter of about ¼ inch. Such shapes may be assembled into the bed by merely being poured into the stove; or, if desired, they may be assembled by hand placing.

Illustrative of the surface area-volume relationship above referred to are the following data of surface areas, in square feet, of 1 cubic foot assemblages of differently sized refractory bodies of spherical shape, with 40% of void space:

*Table*

| Average diameter | | Mesh size opening (Tyler) | Total surface area in sq. ft. per 1 cu. foot |
|---|---|---|---|
| Inches | Feet | | |
| 2 | 0.167 | | 21.6 |
| 1.67 | 0.139 | | 25.9 |
| 1 | 0.0833 | | 43.2 |
| 0.5 | 0.0417 | | 86.4 |
| 0.2 | 0.0167 | 3–4 | 216 |
| 0.125 | 0.0104 | 6 | 335 |
| 0.1 | 0.0083 | 7–8 | 432 |
| 0.0625 | 0.0052 | 10 | 691 |
| 0.05 | 0.0041 | 12–14 | 864 |

For assemblages having other percentages of voids the surface area/volume relationships will be somewhat different but may be considered to be of the same order as those set out in the above table. A thorough discussion of these relationships is found in "Trans. Amer. Inst. of Chem. Eng.," vol. 39, #1, (Feb. 25, 1943) pages 1 to 35, article entitled "Heat, mass and momentum transfer in the flow of gases through granular solids," by B. W. Gamson, G. Thodos and O. A. Hougen.

The enclosure for the pebble beds (i. e., the hereinbefore referred-to "tubular thermally insulated vessel") may be, and preferably is, a monolithic shaft or unitary wall structure formed of refractory material, the shaft being characterized by having a fair amount of mechanical strength and by being substantially impervious to gases. Thus, it may be a hollow cylindrical "casting" of rammed magnesia or other refractory composition. Selection of the refractory material to be employed in constructing the shaft is determined mainly by the temperatures to be encountered; thus, the shaft may be constructed from refractory brick; or, the enclosure may be formed from a mass of discrete particles of refractory material so small in size as to present a pressure drop greater than that of the shaft filling so enclosed, i. e., the enclosure may be vertically macadamized material functioning as a wall of low gas permeability without having the rigidity of a monolithic structure.

The furnace of the present invention has the following advantages over conventional types of furnaces:

1. The only part of the furnace which is highly heated is a simple cylinder. There is no hot roof or hot floor; moreover, there is no rigid connector extending out from the central wall of the furnace. No stresses or strains can be developed at points of attachment of inter-meshing parts, or parts extending along different axes.

2. The necessary gas connections for air and for fuel gas are confined to the relatively unheated ends of the cylinder and the colder parts of the pebble beds, where connections can be made easily and safely without trouble from cracking.

3. A means for the positive mixing of fuel gas and air, after the same have passed through the preheating bed, is provided.

4. Through the use of a plurality of spaced fuel gas inlets projecting through the cold end or ends of the furnace toward the central combustion zone, it is possible to expand the cross-sectional area of the furnace to any size desired without introducing the difficulty of inadequate mixing which results when one attempts to introduce all of the fuel into said combustion zone at the periphery of the latter. Thus the design is ideally suited to expansion to large structures—and the larger the furnace the lower is the percentage of heat loss.

The invention will now be described in greater detail and with reference to the accompanying drawing, in which.

Figure 1:
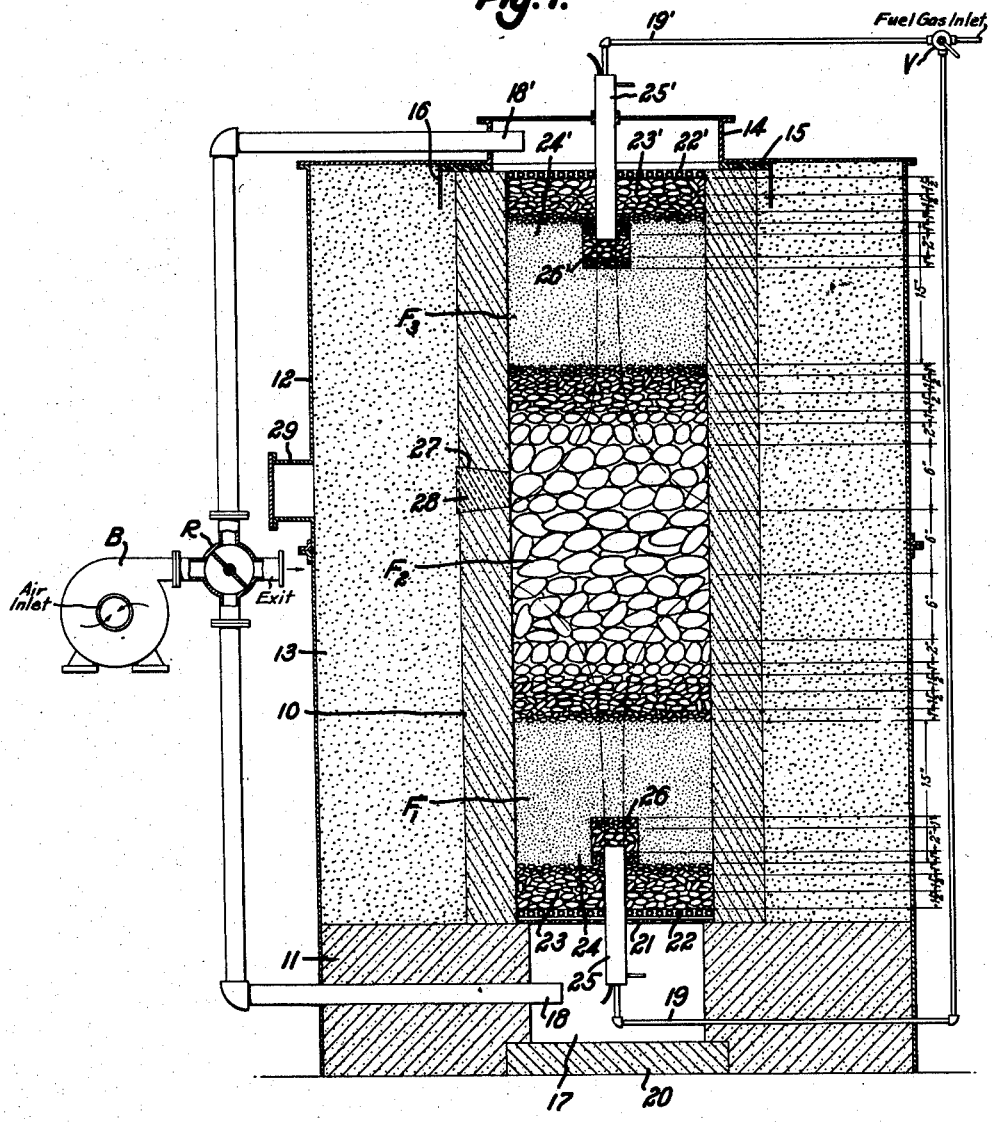
Fig. 1 is an axial vertical sectional view of an operable embodiment of apparatus in accordance with the invention.
Figure 4:
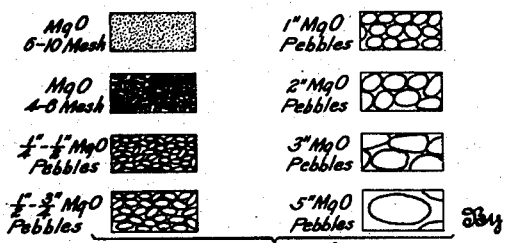
Fig. 4 is a chart showing the particle sizes of the different pebbles appearing in the shaft fillings of Figs. 1 and 2.

In Fig. 1, F1, F2, F3 taken together represent a shaft filling (hereinafter to be more fully described) about 18 inches in diameter enclosed within a cylindrical refractory wall 10 of rammed magnesia supported upon a base 11 of heat-resistant concrete (lumnite). 12 represents an outer metal (e. g., sheet iron) shell surrounding wall 10, and 13 is a mass of loose unclassified magnesia insulation supported by base 11 and filling the annular space between wall 10 and outer shell 12. Said annular space is made substantially gas-tight by means of a centrally domed cover 14 which is secured, along its periphery, to outer shell 12 and which makes a substantially gas-tight fit against the top of wall 10 by interposition therebetween of a caulking layer 15 comprising a suitable "mortar" or paste of finely divided magnesia backed by asbestos packing. As is indicated in the drawing, a depending baffle ring 16 may be secured to the underside of cover 14 along an annulus concentric with but spaced from wall 10, and the asbestos packing of caulking layer 15 may, as shown, be extended outwardly from wall 10 under cover 14 to such baffle ring. A function of this baffle ring is to deflect any gas, seeping from the furnace, downwardly into the mass 13 of loose, relatively impervious insulation.

The lumnite base 11, of substantial depth, is formed to provide a base chamber 17 substantially concentric with but of smaller diameter than wall 10, into which base chamber there project, through said base, a conduit 18 for introduction of air under pressure and a second conduit 19 for fuel gas. As is diagrammatically illustrated in the drawing, a portion 20 of the base 11 may be so cast as to be removable from the base whereby to provide access to base chamber 17.

The top opening of base cavity 17 is bridged by a plurality of spaced metal bars 21 supporting a water-cooled grate 22. This latter comprises a coiled iron pipe whose inlet and outlet connections (not shown) pass through base chamber 17 and base 11 to the outside. Upon bars 21 and grate 22 is supported the shaft filling F1, F2, F3.

Zone F1 of the shaft filling is composed of (a) a relatively thin layer 23 of macadam of refractory pebbles in sizes ranging upwardly from 1 inch diameter pebbles immediately adjacent grate 22 to ¼–½ inch diameter pebbles and (b) a superposed pebble bed 24 of refractory pebbles selected as to size to pass a 6-mesh but be caught on a 10-mesh Tyler screen. It is noted, at this point, that the main function of macadam 23 is to support pebble bed 24 and to maintain the same against sifting through grate 22. Were grate 22 so constructed as to be able directly to support pebbles of the relatively small pebble bed 24, macadam 23 might be omitted.

Adjacent to and above that portion of the filling which constitutes zone F1 is a column of symmetrically doubly macadamized refractory bodies constituting zone F2 of the shaft filling. As will be clearly understood from an inspection of the drawing, the symmetrical double macadamization is brought about by superposing over pebble bed 24 a succession of layers of larger and larger pebbles ranging from 4–6 mesh, immediately adjacent the top of pebble bed 24, through ¼–½ inch, ½–¾ inch, 1 inch, 2 inch and 3 inch sizes to a central mass of 5 inch chunks of magnesia, and an upper reverse succession of the layers to a top layer of the 4–6 mesh pebbles. As is shown, the thicknesses of the several layers of refractory bodies in portion F2 vary between say 1 inch for the layers of 4–6 mesh material to say 6 inches for the layers of 3 inch material and 6 inches for the 5 inch chunks.

Zone F3 of the shaft filling is constituted by a bed 24' of 6–10 mesh material, identical with bed 24, above and immediately adjacent to top of zone F2, and a top macadam 23' identical with bottom macadam 23 except that the direction of macadamization is here reversed.

Above the shaft filling is a top water-cooled grate 22', similar to bottom grate 22. The inlet and outlet connections (not shown) of grate 22' pass through the domed cover 14. Into the dome space of cover 14 lead an air conduit 18' and a fuel gas conduit 19' similar to 18 and 19 respectively.

25 and 25' are two similar water-jacketed fuel gas inlets each extending inwardly into an end of the shaft filling through the water-cooled grate and the outer macadam and somewhat into the adjacent pebble bed. 26 and 26' represent two similar gas-permeable cowls for the inner ends of inlets 25 and 25', each composed of refractory bodies so disposed as to provide for the relatively free passage of the fuel gas therethrough while at the same time serving to prevent stoppage of the associated inlet pipe by the small particles of the adjacent pebble bed (24 or 24'). These cowls may be mounds of loose ½–¾ inch pebbles assembled about the mouths of the inlets or they may be unitary "caps" of fritted or incipiently sintered pebbles fitting over the ends of said inlets.

If desired there may be provided in wall 10 an outwardly tapered opening 27 for the reception of a correspondingly tapered removable refractory plug 28. In such event, outer shell 12 is provided with a capped fitting 29 of suitable diameter positioned opposite said plugged opening and giving ingress to the latter. Into such an opening there may be inserted a refractory tube for introduction of a pyrometer (e. g., optical pyrometer) or other instrument for determining a condition (e. g., temperature) obtaining within the shaft filling or/and for use in the initial ignition of a fuel gas-air mixture. In connection with this latter function, it may be remarked that such initial ignition may be effected also by use of known suitable electrical means, e. g., a sparking device, positioned in zone F2.

The blowing equipment B for supplying air under pressure through conduits 18 and 18' successively, the reversing mechanism R for periodically reversing the direction of the air current, and the valve mechanism V for opening and closing fuel gas conduits 19 and 19' synchronously with changes in the direction of the air current appear diagrammatically in the drawing as indicating such standard means as may be appropriate for the purpose.

The operation of the above-described apparatus will now be described. Starting with the apparatus "cold," we heat the zone F2 and one of the zones F1 and F3 of the shaft filling to nitrogen-fixing temperature as follows: A current of air is forced through the shaft filling in one direction—say, from the bottom—under sufficient pressure to give a current of about 75 cu. ft. per sq. ft. of cross-sectional area of the pebble bed per minute, and simultaneously a stream of thermally substantially stable fuel gas is introduced by the fuel gas inlet device 25 into the filling through that end thereof through which the current of air is being pressed. The stream of fuel gas passes through the first pebble bed (as described, zone F1) with very little mixing with the surrounding air current; however, as soon as it reaches the adjacent macadam it begins to mix with the air current and mixture progresses to a maximum in the zone of large refractory chunks. The progressive mixing is indicated in Fig. 1 by a suggestive "column" from the fuel gas inlet through the pebble bed, such "column" becoming a "cone" in the macadam of zone F2. Combustion is initiated at this point. The hot products of combustion move through the remainder of zone F2 and into and through the "far" pebble bed (here, zone F3), giving up their heat to the same and passing out of the filling at substantially room temperature.

When the "far" pebble bed has been heated (as evidenced by a rise in the temperature of the effluent gas), the air current reversing mechanism is actuated and simultaneously passage of fuel gas into the "near" pebble bed is stopped and passage of fuel gas by the fuel gas inlet device 25' into the "far" pebble bed is initiated, whereupon (a) the incoming air becomes heated by heat-exchange with the heated pebbles of the "far" pebble bed and (b) the so-heated air mixes in zone F2 with the fuel gas and combustion—at somewhat higher temperature than before (because of the preheat in the admixed air)—takes place in zone F2. The resulting hot products of combustion passing out of zone F2 and into the "near" pebble bed give up their heat to the latter and pass out of the latter at substantially room temperature, thereby completing one cycle.

This cycle of operations is repeated with gradually increasing combustion temperatures until the desired nitrogen-fixing temperature has been reached, whereupon in the continued operation the relative amount of fuel gas being introduced is reduced to that amount necessary (by its combustion) to maintain said desired temperature in zone F2. At said temperature and in said zone an amount of nitrogen of the air enters into an endothermic reaction with an equal amount of unburned oxygen of the air to form nitric oxide, which latter, admixed with residual air and with gaseous combustion products, in passing through the "far" pebble bed is quickly cooled to a temperature at which nitric oxide is stable and eventually to a temperature substantially equal to that of the air entering the near pebble bed. The gas effluent from the system is led to apparatus (not shown) for recovering nitric oxide therefrom.

Figure 2:
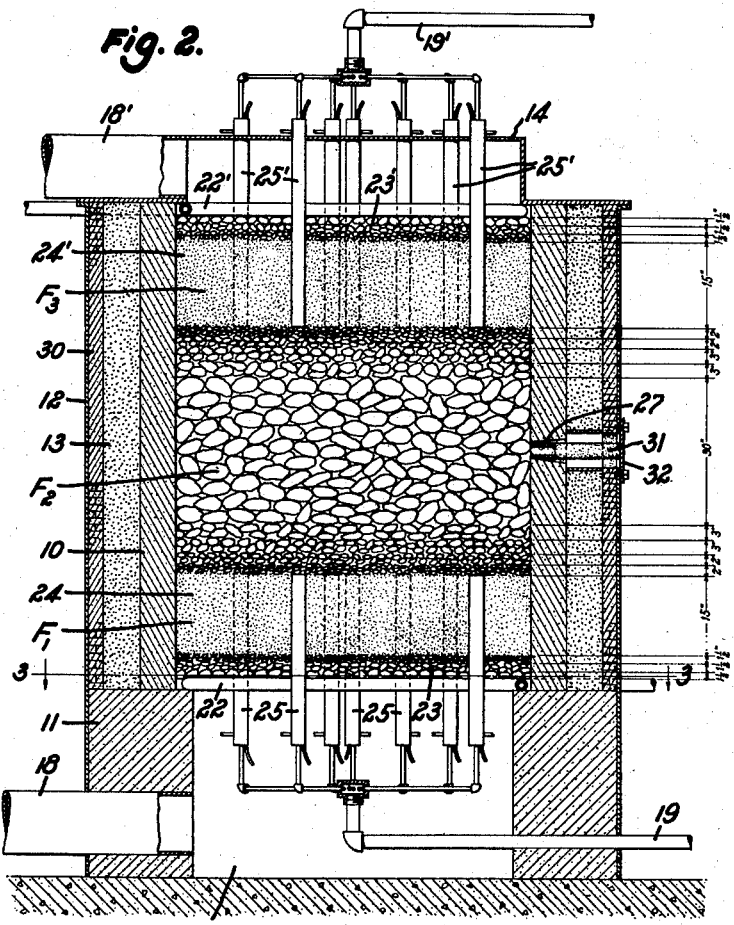
Fig. 2 is an axial vertical sectional view of a modified form of the apparatus according to the invention.
Figure 3:
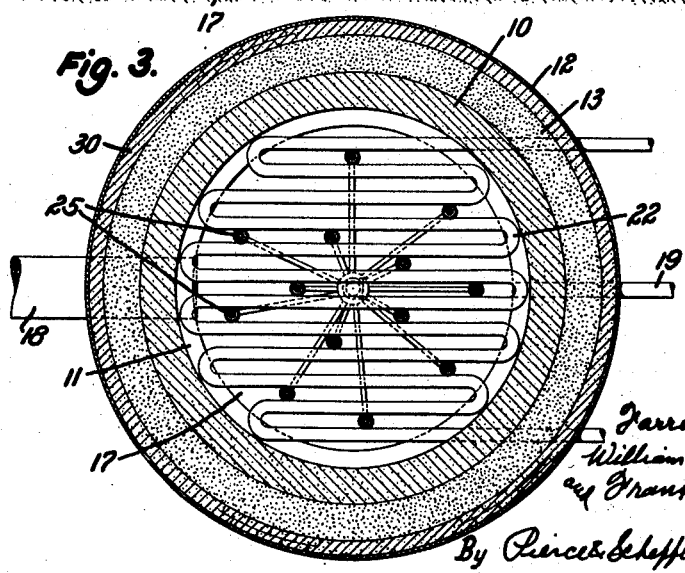
Fig. 3 is a transverse section through the furnace structure of Fig. 2, on line 3—3.

The modified furnace structure illustrated in Fig. 2 needs little additional description. This furnace differs from that illustrated in Fig. 1 mainly in the following respects:

(1) Instead of but one, a plurality of water-jacketed fuel gas inlets 25 (25') are employed at each end of the shaft filling, the same communicating with branched fuel gas conduit 19 (or 19'). As will be apparent, the cross-sectional area of the shaft filling determines the number of fuel gas inlets necessary or desirable, e. g., so that each inlet supplies fuel for about 1.5 sq. ft. of cross-sectional area of the combustion space. The fuel gas inlets shown in Fig. 2 extend (from the outside) through one pebble bed to the edge of the adjacent macadamized combustion zone F2. As shown, they are water-jacketed their full length. This modification is advisable in case a fuel gas rich in thermally unstable components is to be employed, whereby to inject the fuel gas, in substantially uncracked state, into the mixing and combustion space provided by zone F2.

(2) In the construction of the furnace embodiment shown in Fig. 2, we indicate the concept of protecting the outer metal shell 12 with a lining wall 30 of refractory brick.

(3) Adjacent the tapered opening 27 opposite the zone F2 of the shaft filling there is introduced a refractory tube 31 which at its inner end fits the tapered opening. This tube bridges the space between wall 10 and the outer shell 12, and may and preferably does extend radially outwardly from the latter a matter of several inches. The tube is provided with a movable closure 32. This arrangement provides for periodic observation of the temperature of the solid particles in the central portion of zone F2, by means of an optical pyrometer.

Where the technic of operation is such as to prevent material outward movement of the "heat plug" through the outer portions of F1 and F3, the water-cooling of the grates 22 and 22' may be dispensed with.

Patent application Serial No. 544,446, filed July 11, 1944, by Frank M. Wolf, discloses a fluid fuel inlet device adapted for use in a pebble bed furnace.

The furnace structure of the present invention has, as was stated hereinbefore, utility not only in connection with the thermal fixation of atmospheric nitrogen as nitric oxide but also in connection with the carrying out of other processes wherein gases or vapors are to be reacted or treated under high temperature conditions. Thus, the furnace is adapted for use in partial oxidations of gaseous or readily vaporizable organic materials in situations wherein it is desired to carry the oxidation to a desired stage and thereat to stop the "oxidation" reaction by quickly "quenching" the gaseous reaction mixture. The furnace also is adapted for use in the thermal reformation of gaseous hydrocarbons.

We claim:

1. A furnace of the "pebble bed" type for the thermal treatment of gases, comprising a substantially tubular wall constituting a shaft, a series of transverse beds of refractory filling supported in said shaft said series including a centrally disposed bed of relatively large refractory objects and beds above and below said centrally disposed bed of relatively small refractory objects, said shaft and filling being so constructed and arranged as to provide spaces above and below said filling, reversible means for alternately directing gases to traverse said shaft filling into said spaces, and reversible means arranged to feed fluid fuel to said centrally disposed bed alternately from above and from below the latter, said fuel feeding means including elongated fluid fuel-injecting devices extending from said spaces toward said centrally disposed bed transversely of and at least partly through said beds of relatively small refractory objects.

2. A furnace of the "pebble bed" type for the thermal treatment of gases, comprising a substantially tubular shaft, a series of transverse beds of refractory filling supported in said shaft said series including a centrally disposed bed of refractory objects a substantial proportion of which are of a size presenting a surface area of less than 22 square feet per cubic foot of volume thereof and beds above and below said centrally disposed bed of refractory objects having an average surface area greater than 22 square feet per cubic foot of volume thereof each of the latter beds merging into said centrally disposed bed through a plurality of stratified transverse layers of refractory pieces of progressively increasing sizes, said shaft and filling being so constructed and arranged as to provide spaces above and below said filling, reversible means for alternately directing gases to traverse said shaft filling into said spaces, and reversible means arranged to feed fluid fuel to said centrally disposed bed alternately from above and from below the latter, said fuel feeding means including elongated fluid fuel-injecting devices extending from said spaces toward said centrally disposed bed transversely of and at least partly through said beds of substantially uniformly sized refractory objects.

3. A furnace of the "pebble bed" type for the thermal treatment of gases, comprising a substantially tubular shaft, a supporting grating, a series of transverse beds of refractory filling in said shaft supported on said grating said series including a centrally disposed bed of refractory objects a substantial proportion of which are of a size presenting a surface area less than 22 square feet per cubic foot of volume thereof and beds above and below said centrally disposed bed of refractory objects having on the average a surface area greater than 22 square feet per cubic foot of volume thereof each of the latter beds merging into said centrally disposed bed through a plurality of stratified transverse layers of refractory bodies of progressively increasing sizes, said shaft and filling being so constructed and arranged as to provide spaces above said filling and below said grating, reversible means for alternately directly gases to traverse said shaft filling into said spaces, and reversible means arranged to feed fluid fuel to said centrally disposed bed alternately from above and from below the latter, said fuel feeding means including elongated fluid fuel-injecting devices extending from said spaces toward said centrally disposed bed transversely of and through said beds of substantially uniformly sized refractory objects.

4. A furnace for the thermal treatment of gases, comprising a substantially tubular shaft, a supporting grating, a series of transverse beds of refractory material constituting a shaft filling in said shaft supported on said grating said beds consisting of a median bed formed of relatively large refractory objects a substantial proportion of which are of a size presenting a surface area of less than 22 square feet per cubic foot of volume thereof, intermediate beds adjacent to said median bed each intermediate bed being formed of refractory objects of progressively decreasing sizes divergent from said median bed and outlying beds formed of refractory bodies of a size smaller than that of any of the refractory objects constituting the median and intermediate beds, and having a surface area of more than 22 square feet per cubic foot of volume thereof, said shaft and filling being so constructed and arranged as to provide open spaces above said shaft filling and below said grating, reversible means for forcing a current of gas serially through one of said open spaces the beds constituting said shaft filling and to and through the other of said open spaces alternately in one direction and in the reverse direction, at least one elongated fluid fuel-injecting device extending from each of said open spaces into said shaft filling transversely of the adjacent outlying bed thereof substantially to the adjacent intermediate bed of said shaft filling, and reversible means for supplying fluid fuel to said injecting devices concurrently with said gas current.

5. A furnace of the "pebble bed" type for use in the fixation of nitrogen as nitric oxide, comprising a substantially tubular wall constituting a shaft, a series of transverse beds of refractory filling supported in said shaft said series including a centrally disposed bed of relatively large refractory objects and beds above and below said centrally disposed bed of relatively small refractory objects, said shaft and filling being so constructed and arranged as to provide spaces above and below said filling, reversible means for alternately directing gases to traverse said shaft filling into said spaces, and reversible means arranged to feed fluid fuel to said centrally disposed bed alternately from above and from below the latter, said fuel feeding means including elongated fluid fuel-injecting devices extending from said spaces toward said centrally disposed bed transversely through said beds of relatively small refractory objects.

6. A furnace of the "pebble bed" type adapted for use in the fixation of atmospheric nitrogen as nitric oxide, said furnace comprising a substantially vertical tubular wall of refractory material; a gas-traversable shaft filling of refractory material supported within said tubular wall, said shaft filling being constituted by two outlying substantially horizontal pebble beds, each consisting of chaotically disposed relatively small refractory bodies, the average surface area of said bodies being more than 22 square feet per cubic foot of volume thereof, spaced apart by a column of refractory bodies which are larger than those composing said outlying pebble beds with the largest thereof in a central portion of said column and a substantial proportion of which are of a size presenting a surface area less than 22 square feet per cubic foot of volume thereof, the sizes of the other refractory bodies composing said column being graduated in small increments from the sizes of the bodies of the outlying beds to the size of the centrally located largest bodies; closure members at both ends of said tubular wall defining with the latter and with surfaces of the shaft filling two open spaces one at each end of said shaft filling; means including conduits and a source of air under pressure for forcing a current of air through one of said open spaces and into and through said shaft filling and for conducting air from the other open space; valve means in association with said air-forcing means for periodically reversing the direction of the air current through said open spaces and shaft filling; a source of fuel gas under pressure; at least one fuel gas injecting device, comprising an elongated inlet member, extending into said shaft filling, transversely with respect to said beds, from each of said open spaces, each fuel gas injecting device extending at least partly through an outlying pebble bed and in the direction of said column of said shaft filling; and valved conduits connecting said fuel gas injecting devices with said fuel gas source.

7. A furnace of the "pebble bed" type adapted for use in the fixation of atmospheric nitrogen as nitric oxide, said furnace comprising a substantially vertical tubular wall of refractory material; a gas-traversable shaft filling of refractory material supported within said tubular wall, said shaft filling being constituted by two outlying substantially horizontal pebble beds, each consisting of chaotically disposed refractory bodies, each of the outlying pebble beds being characterized by a surface area in excess of 22 square feet per cubic foot of volume of the refractory bodies, said outlying pebble beds being spaced apart by a column of refractory bodies, which are larger than those composing said pebble beds and a substantial proportion of which are of a size presenting less than 22 square feet of surface area per cubic foot of volume, with the largest thereof in a vertically central portion of said column the sizes of the other bodies composing said column being graduated from the sizes of the bodies of the outlying pebble beds to the size of the centrally located largest refractory bodies; closure members at both ends of said tubular wall defining in cooperation with said wall and with terminal surfaces of said shaft filling two open spaces one at each end of said shaft filling; an air compressor; a reversing valve; conduit means communicating between said air compressor and each of said open spaces through said reversing valve whereby a current of air can be caused to pass serially through one open space said shaft filling and the other of said open spaces alternately in one direction and in the reverse direction; fuel gas injecting devices extending from said open spaces into said shaft filling transversely through said outlying pebble beds and to said column; a source of fuel gas under pressure; and valved conduits communicating between said source and said injecting devices for delivering fuel gas through the latter to said column alternately from above and from below said column.

8. In a process for the thermal fixation of nitrogen as nitric oxide, the steps which comprise: passing air in alternate upward and downward runs through successive beds of refractory bodies in a shaft furnace, said beds comprising an intermediate bed of relatively large bodies and upper and lower adjacent beds of relatively smaller bodies, and heating said intermediate bed to a high tmeperature sufficient to induce the oxidation of nitrogen by injection of a fluid combustible adjacent the junction of said intermediate bed and one of said other beds during at least a portion of each of said runs, and recovering nitric oxide thus produced.

FARRINGTON DANIELS.
WILLIAM G. HENDRICKSON.
FRANK M. WOLF.

REFERENCES CITED

The following references are of record in the file of this patent:

UNITED STATES PATENTS

| Number | Name | Date |
|---|---|---|
| 1,062,122 | Schroeder | May 20, 1913 |
| 2,272,108 | Bradley | Feb. 3, 1942 |
| 777,485 | Pauling | Dec. 13, 1904 |
| 2,071,721 | Bagley et al. | Feb. 23, 1937 |